United States Patent
Danilov et al.

(10) Patent No.: US 12,331,869 B2
(45) Date of Patent: Jun. 17, 2025

(54) INSPECTION DEVICE AND INSPECTION UNIT

(71) Applicant: ROSEN SWISS AG, Stans (CH)

(72) Inventors: Andrey Danilov, Lingen (DE); Ben Bosse, Lingen (DE); Patrik Rosen, Meppen (DE)

(73) Assignee: Rosen IP AG, Stans (CH)

( * ) Notice: Subject to any disclaimer, the term of this patent is extended or adjusted under 35 U.S.C. 154(b) by 0 days.

(21) Appl. No.: 17/760,247

(22) PCT Filed: Feb. 5, 2021

(86) PCT No.: PCT/EP2021/052790
§ 371 (c)(1),
(2) Date: Aug. 5, 2022

(87) PCT Pub. No.: WO2021/156433
PCT Pub. Date: Aug. 12, 2021

(65) Prior Publication Data
US 2023/0054659 A1    Feb. 23, 2023

(30) Foreign Application Priority Data

Feb. 5, 2020 (DE) .................. 10 2020 102 951.9

(51) Int. Cl.
*F16L 55/28* (2006.01)
*F16L 55/26* (2006.01)
(Continued)

(52) U.S. Cl.
CPC .............. *F16L 55/28* (2013.01); *H04N 5/76* (2013.01); *H04N 7/188* (2013.01); *H04N 23/60* (2023.01); *F16L 2101/30* (2013.01)

(58) Field of Classification Search
None
See application file for complete search history.

(56) References Cited

U.S. PATENT DOCUMENTS 6,820,653 B1    11/2004  Hagen
9,579,927 B2 *   2/2017  Parrott ................. B60B 19/003
(Continued)

FOREIGN PATENT DOCUMENTS

CN        105043312 B    11/2017
DE    102013011626 A1     1/2015
(Continued)

OTHER PUBLICATIONS

San-Millan, "Design of a teleoperated wall climbing robot for oil tank inspection", 23rd Mediterranean Conference on Control and Automation (MED), Jun. 16-19, 2015, pp. 274-280 (Year: 2015).*
(Continued)

*Primary Examiner* — Hung Q Dang
(74) *Attorney, Agent, or Firm* — Husch Blackwell LLP

(57) ABSTRACT

An inspection device for examining pipelines is provided, and comprises a sensor carrier which in operation is rollable through the pipeline. The sensor carrier has an at least essentially circular circumference in a cross section that runs transverse to an axis of rotation. The sensor carrier also has at least one sensor unit. The sensor carrier further comprises at least one stabilizing means, preferably a multitude disposed along the circumference.

18 Claims, 5 Drawing Sheets

(51) Int. Cl.
   *H04N 5/76* (2006.01)
   *H04N 7/18* (2006.01)
   *H04N 23/60* (2023.01)
   *F16L 101/30* (2006.01)

(56) References Cited

U.S. PATENT DOCUMENTS

| | | | | |
|---|---|---|---|---|
| 2004/0183528 | A1* | 9/2004 | Crouch | G01N 27/725 324/228 |
| 2005/0145018 | A1* | 7/2005 | Sabata | G01N 17/00 73/49.1 |
| 2008/0204008 | A1 | 8/2008 | Paulson | |
| 2009/0161240 | A1* | 6/2009 | Chang | G02B 7/021 359/824 |
| 2011/0103189 | A1* | 5/2011 | Paulson | G01S 11/14 367/93 |
| 2013/0340793 | A1* | 12/2013 | Lund | B08B 9/0553 134/22.11 |
| 2014/0009598 | A1* | 1/2014 | O'Donnell | G03B 37/04 348/84 |
| 2014/0130568 | A1* | 5/2014 | Bloss | G01N 21/93 73/1.01 |
| 2014/0152803 | A1* | 6/2014 | Carlson | B60B 19/003 348/84 |
| 2014/0362242 | A1* | 12/2014 | Takizawa | H04N 23/55 348/208.11 |
| 2017/0237908 | A1* | 8/2017 | Ko | H04N 23/57 386/341 |
| 2018/0177064 | A1 | 6/2018 | Hubertus et al. | |
| 2018/0232874 | A1* | 8/2018 | Østervold | G01B 7/06 |
| 2020/0088684 | A1* | 3/2020 | Banks | F16L 55/40 |
| 2020/0094618 | A1* | 3/2020 | La | B60C 11/14 |
| 2020/0238977 | A1* | 7/2020 | Jeong | G05D 1/0016 |

FOREIGN PATENT DOCUMENTS

| | | | | |
|---|---|---|---|---|
| EP | 1215436 | A2 | 6/2002 | |
| EP | 3644082 | A1 * | 4/2020 | B60B 19/006 |

OTHER PUBLICATIONS

Espinoza et al., "Navigation's Stabilization System of a Magnetic Adherence-Based Climbing Robot", Springer 2014, pp. 65-81. (Year: 2014).*

Tavakoli et al., "OmniClimbers: Omni-directional magnetic wheeled climbing robots for inspection of ferromagnetic structures", Robotics and Autonomous Systems 61 (2013), pp. 997-1007. (Year: 2013).*

Hillenbrand et al., "A Sensor System for the Localisation of Climbing Robots," Fourth International Workshop on Robot Motion and Control, Jun. 17-20, 2004, pp. 109-114. (Year: 2004).*

* cited by examiner

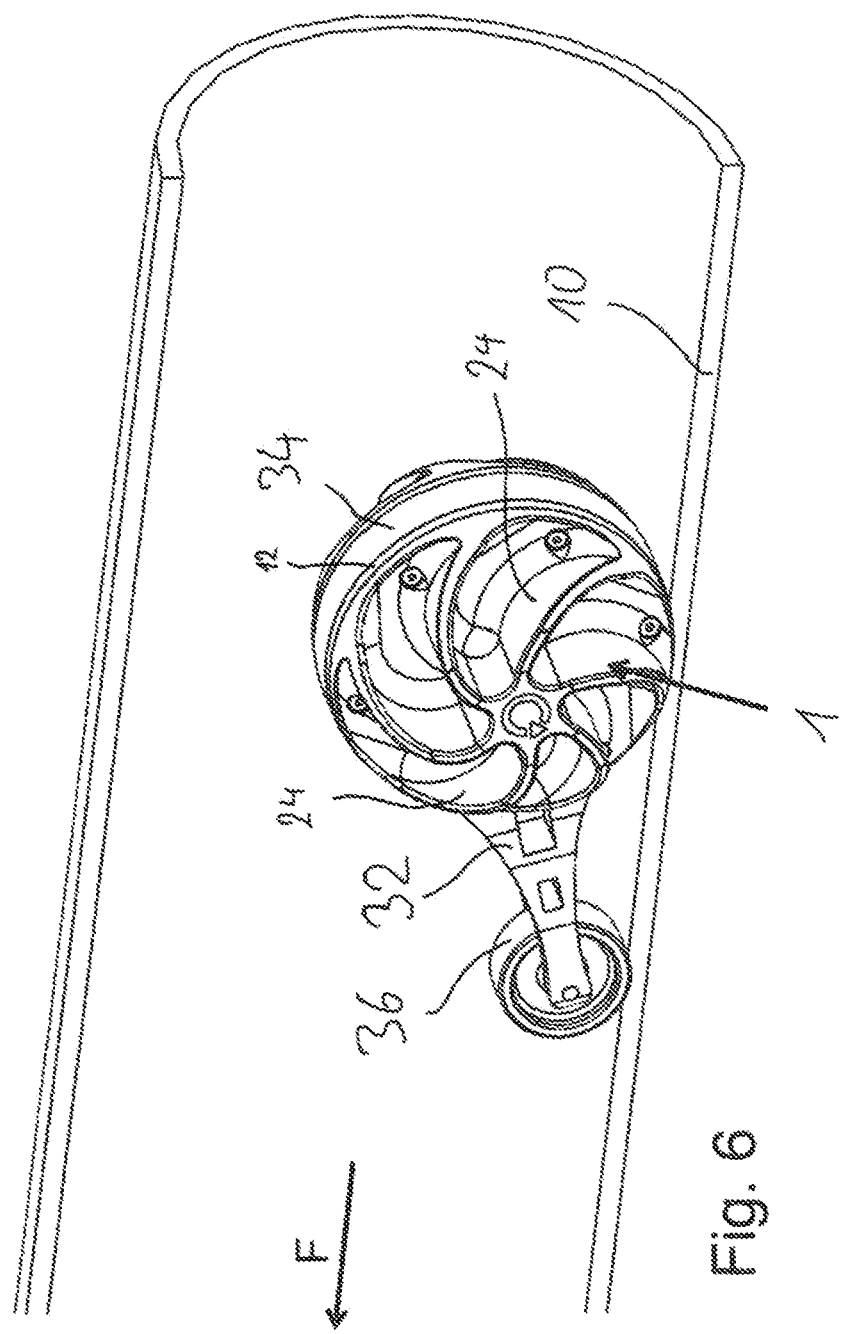

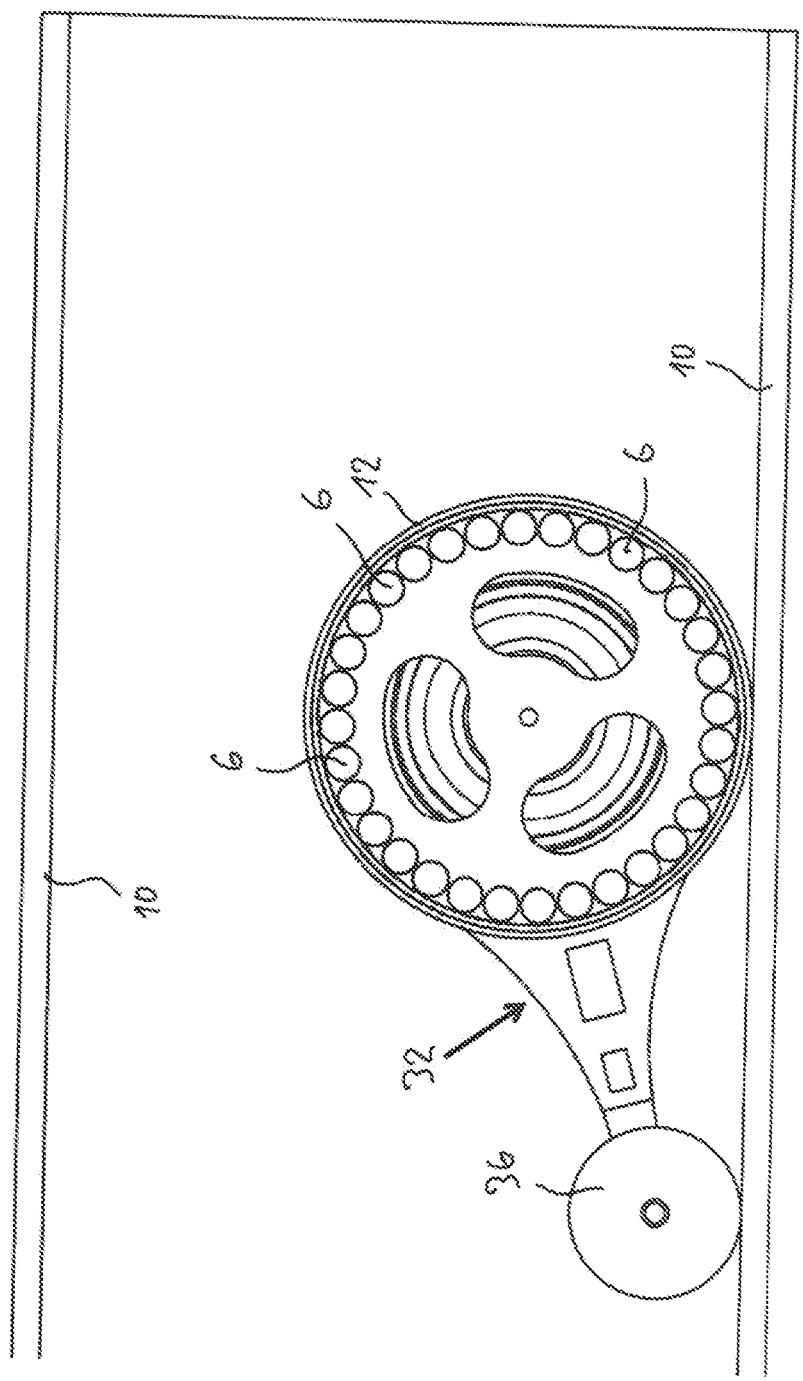

INSPECTION DEVICE AND INSPECTION UNIT

CROSS REFERENCE

This application claims priority to PCT Application No. PCT/EP2021/052790, filed Feb. 5, 2021, which itself claims priority to German Patent Application No. 10 2020 102951.9, filed Feb. 5, 2020, the entireties of both of which are hereby incorporated by reference.

FIELD OF THE INVENTION

The present invention relates to an inspection device for examining pipelines, comprising a sensor carrier which in operation is rollable through the pipeline and which is provided with an at least essentially circular circumference in a cross section that runs transverse to an axis of rotation and which has at least one sensor unit.

BACKGROUND OF THE INVENTION

Media such as oil, gas, water or mixtures thereof are transported globally in pipelines, especially in the form of magnetizable steel pipes. Over the course of a lifetime of such a pipeline, various defects can occur in the wall thereof. These include wear and fatigue phenomena that can lead to disrupted operation in the long term. With increasing age of a pipeline, there will naturally be increasing occurrence of these defects, and it is therefore necessary to monitor pipelines to an enhanced degree.

The most common method of inspection of pipelines is inspection with what are called intelligent pigs, but this is not always possible, for example depending on the geometry and course of the pipeline. A substitute used for intelligent pigs is therefore devices in the form of a sphere. Such a compact construction has greater ability to travel through a pipeline and correspondingly very good passage properties.

Such spherical inspection devices move irregularly within the pipeline on account of the dynamics of the transporting medium and the course of the pipeline; they can jump, turn or slide in all three spatial axes. These irregular movements result in a very high complexity in the interpretation of data, which can become impossible because signal-to-noise ratios are too low. This is true both of the interpretation of the defect data and of the position of the defects. Such prior art is described, for example, in EP 2902690 B1.

BRIEF SUMMARY OF THE INVENTION

It is an object of the present invention to provide an inspection device having more stable operational characteristics.

According to the invention, the sensor carrier comprises at least one stabilizing means, preferably a multitude disposed along the circumference. The one or more stabilizing means in operation promote(s) or improve(s) movement of the inspection device in a direction at least essentially transverse to a chosen axis of rotation, and rolling against the circumference. In operation, the rolling is especially along the pipeline axis, in which case the axis of rotation is preferably at least essentially transverse thereto if it forms an angle of +/−10° with the pipeline axis.

There is an improvement in rolling characteristics especially when the rolling of the inspection device around a circumference in the pipeline about the chosen axis of rotation is better, i.e. more homogeneous or better than is possible at all around a different circumference with a further axis of rotation which is then transverse or angled with respect to the chosen axis of rotation. The device especially rolls on the part(s) of the inspection device that form(s) the circumference.

The one or more stabilizing means is/are especially removed from the axis of rotation, i.e. disposed within or on the outer circumference, optionally form(s) part of it and ensure(s) more stable rolling of the inspection device by virtue of the force that it/they exert or a momentum that arises thereby.

Regardless of whether the sensor carrier is an essentially circular or ellipsoidal sensor carrier, the one or more stabilizing means disposed along the circumference promote(s) a movement when, for example, compliance with an alignment of an axis of rotation of the device is stabilized, for example by increasing an angular momentum generated, or by means of adhesion to the pipeline wall. The latter means assist gravitational movement of the inspection device in the pipeline along the 12 o'clock or 6 o'clock position.

A circumference is circular when rolling of the inspection device on the circular circumference is possible at a planar level without measurement of disruptive acceleration peaks. The circular circumference is thus an exactly circular circumference or, for example, an approximation of a circular circumference resulting from a polygonal chain. The same applies to a spheroidal form and to those listed further down. An ellipsoidal form is a form that differs from an ellipsoid by exactly one ellipsoid or by a few centimeters, i.e. less than 10 cm, preferably less than 5 cm.

The stabilizing means may form part of the circumference or be disposed close to the circumference; for example, the cross section that runs transverse to the axis of rotation can run through or along the stabilizing means that are especially spaced apart radially from the axis of rotation.

Stabilizing means provided are preferably one or more weights spaced apart radially from the axis of rotation and/or one or more magnets that are especially spaced apart radially from the axis of rotation, in which case a respective magnetic field of the magnet(s) interacts in operation with the pipeline wall. In particular, the magnets have a higher weight than regions of the inspection device offset radially with respect to the axis of rotation. While a weight already increases the angular momentum generated and hence promotes compliance with the direction of the axis of rotation, one or more magnets in the circumference or along the circumference of the inspection device, as well as any increase in angular momentum, at least increase(s) adhesion between wall and device and hence significantly promote(s) slip-free running. As the inspection device rolls, the magnetizable material of the pipeline becomes magnetized and becomes demagnetized again when the magnet is removed during rolling, which results in eddy currents that counteract any increase in the running speed of the device and hence greatly improve running characteristics. The magnets, which may themselves also constitute additional weights along the circumference, thus promote distinctly more stable running of the device, firstly on account of gravity and secondly on account of the magnetic interaction.

Magnets used are preferably permanent magnets. However, they may also be electromagnets, such that the strength of interaction with the wall of the pipeline is adjustable by means of a corresponding control device.

In one design as permanent magnets, the north-south alignment of the permanent magnets preferably runs parallel to the axis of rotation, such that no forces in tangential direction of the circumference occur at the circumference.

Alternatively or additionally, it is possible for one or more or else all of the magnets designed as permanent magnets to be aligned with their north-south alignment radial to the axis of rotation, in order to correspondingly likewise allow no tangential forces to arise.

This rotationally symmetric placement of the magnets in the stationary state does not generate any tangential forces; it enables easier rolling, and it is only when the device rolls through the eddy currents induced in the pipe that there is buildup of magnetic forces that counteract the movement and slow the propulsion of the device. By means of a corresponding control device, especially when electromagnets are used, it is therefore possible to establish a braking force, for example depending on the speed to be attained or the speed defined, or on the basis of a speed range.

In particular, the magnets are arranged close to one another or alongside one another over the circumference, a close arrangement being understood to mean a distance between the magnets, provided with or without any surround, of especially ≤5 cm, preferably ≤3 cm. In particular, the magnets directly adjoin one another, with or without a surround.

In a further advantageous configuration of the invention, the magnet(s) is/are bounded at least on one side by a surround which includes a magnetizable material and preferably consists thereof. Viewed in the direction of the axis of rotation, this surround is preferably circular and magnetizable. In particular, this surround may form part of the circumference. In this way, bundling of the magnetic field lines in the direction of the wall is possible, such that the magnetic flux is guided better into the pipeline wall. In particular, two metal disks in circular ring form may be used at the sides of the magnets installed in the circumference of the device.

Preferably, the sensor carrier is in spheroidal or ellipsoidal form at least with regard to a shell. In the case of an ellipsoidal or ellipsoid shell, the lengths of two half-axes, especially of equal length, are preferably greater than the length of the third half-axis lying in the axis of rotation. The third half-axis should preferably have a length between half and 100% of the length of one of the two other half-axes. This effectively prevents overturning, such that this form achieves improved passage capacity. In combination with the stabilizing means, the device may be matched to the curvature of the pipeline with regard to its shell. Thus, alignment along the pipe axis is facilitated by the flow of the medium, and space is created at the same time for any drive elements.

The ellipsoidal form in the present context is thus a rotationally symmetric form that can roll through a pipeline in a stable manner, and in which the chosen length of the third half-axis is not too short, such that the device tilts rapidly to the side.

Even the stabilizing means that are especially in the form of magnets on their own, and especially in combination with the shape of the inspection device, mean that it is self-stabilizing and self-corrects again as it moves onward in the pipeline if the inspection device has tilted to the side.

In an alternative design to a variant of the invention that can roll through the pipeline without support, the sensor carrier that is otherwise provided with a likewise spherical or at least essentially ellipsoidal shell may be held and especially mounted in a rotatable manner in a support element provided on the pipeline wall for support of the inspection device, especially one which comprises the sensor carrier at one end and is formed for support on the pipeline wall at the other end, preferably with a smaller roller wheel in terms of circumference compared to the sensor carrier circumference. The axis of rotation of such a roller wheel and that of the sensor carrier are preferably in parallel. The result is particularly stable travel through the pipeline at the 6 o'clock position thereof, with the roller wheel formed especially from polyurethane preferably being the front wheel in the direction of travel.

It is additionally possible for a sensor, an energy storage means and/or electronics to be mounted within an elongated carrier that connects the two ends of the support element.

The circumference is preferably formed at least partly by at least one preferably ring-shaped or at least ring segment-shaped and/or elastic damping element produced at least partly from plastic. The damping element may have recesses for sensor units. An appropriate choice of material with a plastic having a coefficient of friction sufficiently high for the pipeline increases adhesion to the pipeline wall and promotes slick-free running. Furthermore, the damping element, in the case of contaminants or elevations in the form of weld seams or the like present on the inside of the surface, can ensure vibration-free running.

In a design with a roller wheel, the ring segment-shaped damping element may form a bearing for the sensor carrier as part of the support element. In that case, the sensor carrier rotates in the damping element, which in that case, however, provides only a minor degree of damping and serves more as a bearing. Alternatively, it is possible to essentially dispense with the damping properties of the ring segment-shaped damping element, as a result of which the support element with the ring segment-shaped portion then merely forms a mount or bearing for the sensor carrier.

Alternatively or additionally, the inspection device has one or more rolling elements that form defined regions of contact of the inspection device for contact with the pipeline wall, preferably to the left and right of the magnets, such that the device is further stabilized and rolling is possible in a more defined manner. More particularly, the rolling elements are the radially outer portions of the surrounds of the magnets with respect to the axis of rotation.

The height of the damping element(s) over adjoining parts of the inspection device, e.g. rolling elements, may correspond preferably, in terms of height, to a standard weld seam in the pipeline over the rest of the inner surface area thereof, and be between 0.1 cm and 3 cm.

Especially in a design of the inspection device in which a load-bearing structure for the sensor carrier is formed at least partly from the same plastic or a further plastic, the entire sensor carrier has damping properties that aid recording of data by any sensors of sensor units. Any vibrations, the energy introduced into the device by these, can dissipate better.

These elastic elements may be deformed in the contact regions of the inspection device with the wall of the pipeline, with the force generated by the deformation acting against the magnetic forces and hence facilitating the separation of the device from the wall, and improving the passage properties of the device as it travels over various barriers such as weld seams or changes in wall thickness. For analysis of the pipelines, it is advantageous when the inspection device includes at least one sensor from the group comprising gyroscopes, acceleration sensors, magnetic field sensors, sound sensors, EMAT sensors, pressure sensors and temperature sensors.

The rotation of the device can be used for performance of odometric measurements. The distance covered can be determined via angle of rotation and device diameter. The angle of rotation can be measured, for example, by measuring the direction of gravity with a gyroscope and/or an acceleration sensor and/or by detecting contact of at least one point on the device with the wall. In addition, the centrifugal acceleration measurable with the gyroscope or the acceleration sensor can also be used to calculate the speed of the device and then also to estimate the distance travelled by the device.

Any acceleration spikes measurable with the acceleration sensor may be used to detect weld seams. Since the position of the weld seams is often known, these signals can be used for correction or determination of the position of the device.

In order to detect contact with the wall at a particular point on the inspection device, it is possible in one development of the invention to use a Hall sensor as magnetic field sensor. By contact with the wall, especially in the region of the closest approach of the magnets to the wall, the magnetic field is varied significantly, which can be recognized with the Hall sensor that rolls past the position with the device. The signal curve recorded here can be used to detect not only the exact point of contact but also a corresponding contact time. The rotation of the device may be calculated on the basis of the events detected, in which case the time is detected in corresponding electronics, either in the control unit or the sensor itself, and then the rotation of the device can be calculated correspondingly on the basis of the signals detected in the inspection device itself or later on.

Alternatively or additionally to a Hall sensor, in a further version of the invention, at least one coil may be integrated in an inventive device. A magnetic field detected in the coil may then likewise be used to calculate the rotation of the device.

Sound sensors in the form of a hydrophone, for example, may be used to transmit information to the device or to emit sound into the pipeline wall for the purpose of location of the device in particular or other transmission of information. This information may then also be received by sound sensors or microphones outside the pipeline wall or integrated into the pipeline wall. Sound sensors may likewise be ultrasound sensors with which integrity investigations are conducted. More particularly, the device of the invention, in a further execution, may also have EMAT sensors, i.e. electromagnetic transducers, which can generate ultrasound via electromagnetic interactions in the pipeline wall without liquid coupling media. The magnets installed as stabilizing means may find use here for formation of a magnetic field necessary for the generation of ultrasound. In that case, the EMAT sensors are preferably arranged offset from the magnets in various directions in the direction of the axis of rotation of the inspection device.

Pressure and temperature sensors may be used to correct the data obtained.

According to the invention, the inspection device may include at least one camera. The position of the camera here may advantageously be determined with an acceleration sensor in the inspection device, which allows images to be recorded at predefined positions of the camera. Alternatively or additionally, the camera may record image sequences, i.e. videos. There are preferably multiple cameras distributed uniformly around the circumference. Alternatively or additionally, the inspection device also has one or more cameras with the main viewing direction along the axis of rotation.

For example, and especially in an automated manner, it is possible to create a continuous view of the inside of the pipe. The combination of images can especially create video recordings for a particular camera position, as if the camera were not being rotated with the device. In one variant, in which the recording time is tied to the position of the device, the result is thus coverage of the pipeline wall with the images which is uniform in any case, regardless of the running speed of the device. By integration of the data obtained, for example of the distance in the pipeline, it is possible in an automated manner, or triggered by an external signal, to prompt the recording of images or videos at a particular position. For example, it is possible to couple the position of the device to the start of a measurement series in which, for example, one or more ultrasound sensors start a measurement. After the run, the dataset which is stored in the device can then be evaluated for a particular sensor position. Alternatively, a dataset, even in the case of corresponding transfer means via the pipeline or in a wired manner, in individual variants, an evaluation may already take place during the run.

Preferably, lighting means, especially in the form of LEDs, are assigned to each camera.

Advantageously, the inspection device of the invention comprises a generator with a generator coil which is wound with multiple windings such that the magnetic flux through the individual windings changes constantly as the device rotates. This induces an electrical voltage which is used for charging any accumulators present and for power supply to the electronics.

In particular, the inspection device is designed to record an image and/or a sequence of images depending on a position determined by a sensor.

In particular, the inspection device is provided with at least one propulsion element that especially extends away from the axis of rotation. This may comprise, for example, lamellas or lands arranged to the left and right of the stabilizing means based on the axis of rotation, where the construction is especially designed such that the same load-bearing capacity is achieved when the device is rotated by 180° around the axis of rotation. This ensures that the device, in the event of an unexpected rotation by 180°, can continue to run without restriction. In particular, the lamellas are designed so as to generate an angular momentum directed downstream about the axis of rotation. This can be effected, for example, by means of correspondingly coiled lamellas.

In order, for example, to be able to conduct inspections at the 12 o'clock position just as well as at the 6 o'clock position, a device of the invention, in a further working example, is designed such that the sensor carrier has an average density variable by means of fillable cavities in the inspection device and/or weight elements integratable into the sensor carrier and/or an exchangeable load-bearing structure. In this way, it is possible to establish a 12 or 6 o'clock position of the inspection device for a pipeline with a liquid medium.

In order to avoid any unwanted passage of the inspection device into branches of the pipeline, it can be broadened by lateral stabilizers, for example in the form of protruding arms or rudders.

More than one inspection device of the invention may also be coupled to form an inspection unit for the purpose of achieving the object stated at the outset. For this purpose, a central unit, for example in the form of a frame, connects multiple inspection devices as described above or hereinafter.

Such a central unit may have further functional units, for example an energy storage means and/or a data storage means.

Integrated into a conventional pig, the device may also be used as an odometer and/or as a measurement unit for a conventional pig.

BRIEF DESCRIPTION OF THE DRAWINGS

Reference is now made more particularly to the drawings, which illustrate the best presently known mode of carrying out the invention and wherein similar reference char-acters indicate the same parts throughout the views.

FIG. 6 illustrates a further device of the invention.

FIG. 7 illustrates the article according to FIG. 6 in a cross section view, shown in a pipeline.

DETAILED DESCRIPTION OF THE DRAWINGS

Figure 1:
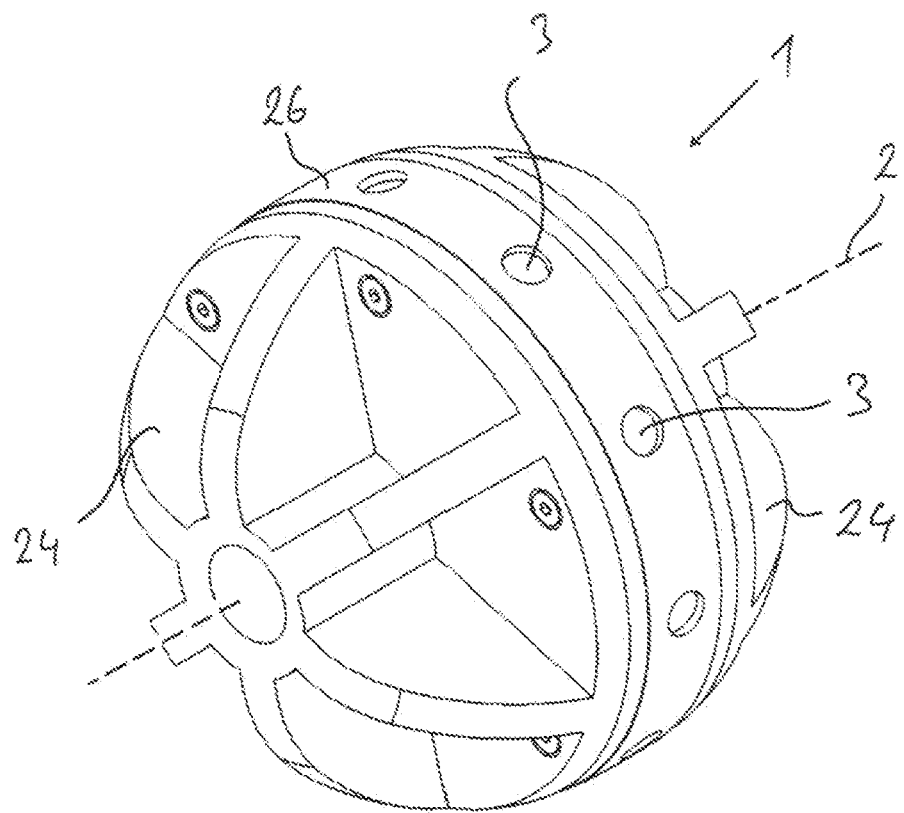
FIG. 1 illustrates an inspection device of the invention in a perspective view.

The features of the working examples of the invention elucidated hereinafter may also be subject matter of the invention individually or in combinations other than those shown or described, but always at least in combination with the features of an independent claim. If appropriate, parts having the same function are given identical reference numerals.

Figure 5:
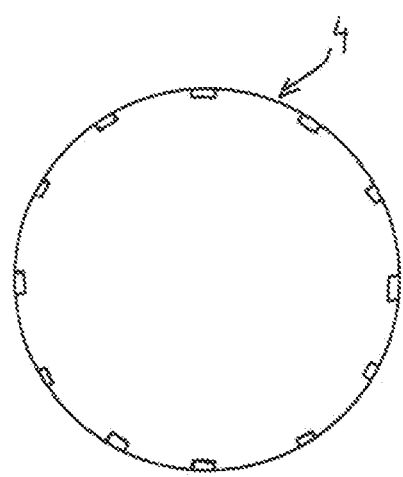
FIG. 5 illustrates a view of a circumference of a device of the invention.

An inspection device of the invention for examination of pipelines in which a fluid, especially water and/or oil, is being transported has a sensor carrier 1 which is rollable in operation through the pipeline and is provided with a circular circumference 4 in a cross section that runs at right angles to an axis of rotation 2 (cf. FIG. 5). FIG. 5 shows merely the outer circumference in a cross section diagram without further functional parts of the inspection device.

In addition, the inspection device, or the sensor carrier 1, has multiple stabilizing means 6 that are arranged over the circumference 4 and, in the present case, take the form of permanent magnets with north pole N and south pole S arranged alongside one another. In operation, the inspection device moves in a direction F (FIG. 3) corresponding to the longitudinal pipeline direction of the pipeline 8. In this case, the respective inspection device rolls along the inside of the pipeline 8.

By virtue of the magnets spaced apart radially from the axis of rotation 2, in operation, the magnetic field interacts with the pipeline wall 10, wherein the rolling on the inner surface of the pipeline wall 10 and the associated changes in magnetic field generate eddy currents that counteract any increase in the running speed of the inspection device in direction F. The rolling of the inspection device in the pipeline 8 is thus more uniform.

Figure 2:
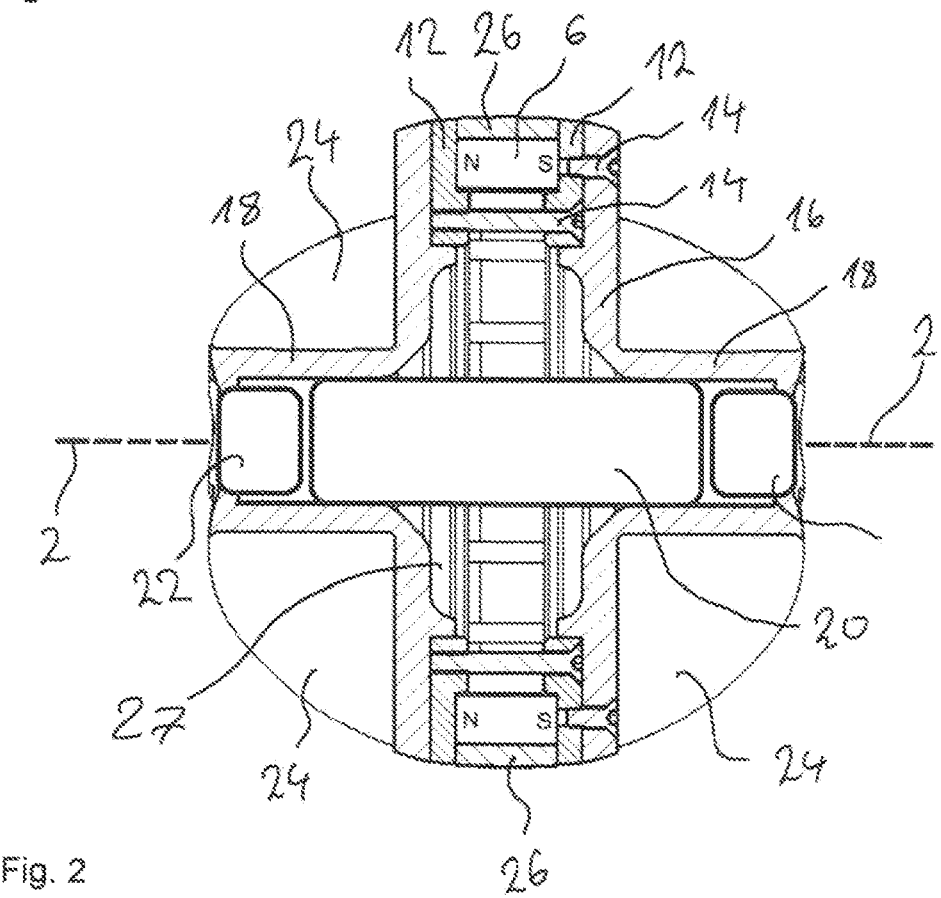
FIG. 2 illustrates the article according to FIG. 1 in a cross section view.

In the present context, the permanent magnets are aligned with their north/south alignment parallel to the axis of rotation 2. The magnets here that are arranged close to one another along the circumference 4 are bounded on either side by a surround 12 in the form of a circular ring in the present case (FIG. 2). These two surrounds 12 may also form part of the circumference and especially form contact sites with the pipeline wall. In particular, however, they direct the magnetic field in the direction of the pipeline wall 10, so as to give rise to a stable interaction during operation.

In the present context, the surrounds 12, which, in a further embodiment of the invention, may also bound the bar magnets in one-piece and u-shaped form, are connected to one another via securing means 14 and to a load-bearing structure 16 for the inspection device.

The load-bearing structure 16 is formed essentially with two halves formed as mirror images, which have a plate-like base on which hollow cylindrical sections 18 are disposed. Disposed partly within these and in a central cavity of the inspection device is an electronics unit 20 comprising a control unit and/or a data storage means and/or an energy storage means and/or an acceleration sensor and/or a communication unit. The electronic unit may be sealed at the open ends of the hollow cylindrical extensions. In the present context, sensors 22 in the form of hydrophones are disposed at this end.

The load-bearing structure for the sensor carrier 1 further comprises propulsion elements 24 formed in one piece with the hollow cylinder 18 and the plate-shaped base, in the form of lamellas that generate flow resistance and which ensure improved propulsion of the inspection device in the pipeline.

A shell of the device has an ellipsoidal shape, in which case the above-designated ends with hydrophones and/or the region designed to come into contact with the pipeline wall, in this and in all other working examples of the invention, may additionally be levelled off.

More particularly, the load-bearing structure 16 has been manufactured from a plastic, preferably from a polyurethane, and has damping properties, in order to minimize disruption of the measurements as a result of any vibrations.

Around the magnets, and forming part of the circumference, is disposed an annular, elastic damping element 26 which has been produced from a plastic and which has, at its outer surface, a greater distance from the axis of rotation than the surrounds 12 that constitute the rolling elements. During operation, the damping element 26 is compressed, as a result of which it acts against the magnetic attraction forces and hence has damping action. Furthermore, the magnets are protected from mechanical damage and, on account of the elevated surface friction, the device rolls better and more uniformly since slip on the pipeline wall is reduced.

Figure 3:
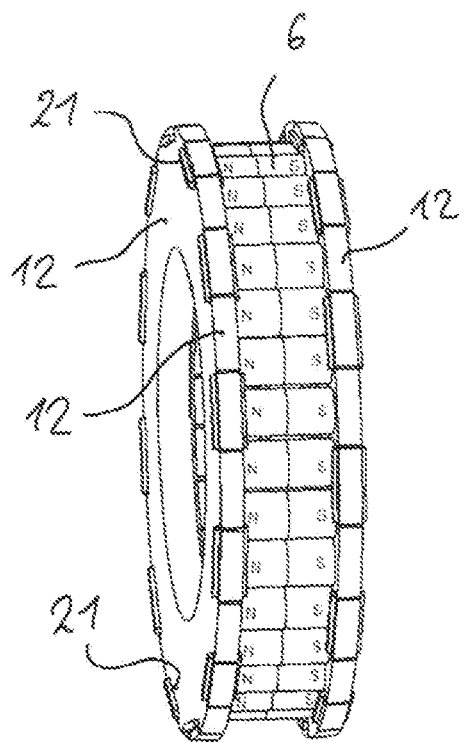
FIG. 3 illustrates a partial view of a portion of the article according to FIG. 1.

The detail view of FIG. 3 shows, in addition to the magnets or stabilizing elements 6 and the surrounds 12, the coils 21 of a generator in which an electrical voltage is induced as the device rolls, which is used to generate energy. This allows the energy storage means to be charged, and the power supply to the device to be improved.

Figure 4:
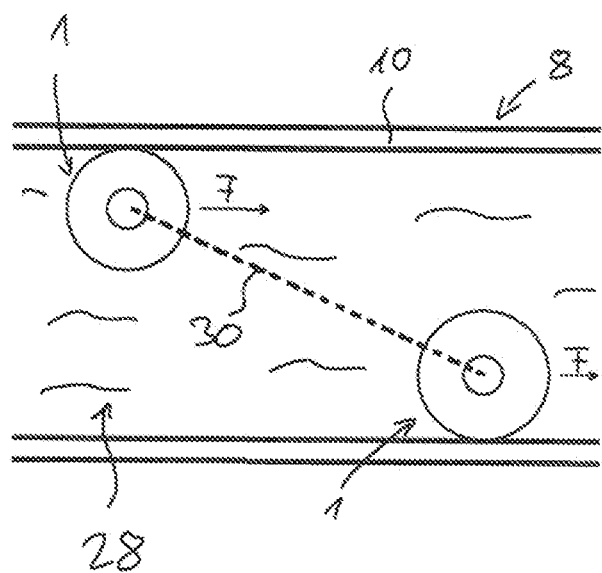
FIG. 4 illustrates an inspection unit of the invention.

Cavities 27 present within the device may be filled by means of a pump system that is not shown in detail, in order to adjust the buoyancy of the inspection device in a medium 28 (cf. FIG. 4) in such a way that a respective inspection device rolls either on the top side of the pipeline wall 10 as shown in FIG. 4 or on the bottom side of the pipeline wall 10.

Both the inspection devices shown in FIG. 4 may be connected to one another by an optional central unit 30 shown by dotted lines, for example in the form of a frame.

Rather than a sensor unit 3, it is also possible for a camera, not referred to as sensor for the purposes of this application, especially a 2D or 3D camera, to be disposed in the inspection device, in which case image detection is always created in a particular relative position of the camera with respect to the pipeline wall on the basis of the data from an acceleration sensor.

A further working example of the invention, according to FIGS. 6 and 7, is provided with a support element 32 provided for support of the inspection device on the pipeline wall, in which the sensor carrier 1 is mounted so as to be rotatable. At one end, the sensor carrier 1 is held by a portion 34 of the support element 32 which is in the form of a circular segment in the above working example; at the other end, a roller wheel 36 is provided for support on the pipeline wall. The portion 34 serves for mounting of the sensor carrier 1 by means of slide bearings or roller bearings. The axes of rotation of the roller wheel 36 and of the sensor carrier 1 run parallel and transverse to the longitudinal direction of the pipeline and direction of travel. The roller wheel 36 is the guiding element of the inspection device, the sensor carrier 1 of which has propulsion elements 24 that lead away from an axis of rotation in the manner of a spiral. This sensor carrier 1 has also been provided with a circular circumference 4 formed by surrounds 12. Magnets are arranged along the circumference as stabilizing means 6. The guiding roller wheel 36 may, according to the working example, likewise be provided with magnets along the circumference.

The invention claimed is:

1. An inspection device for examining pipelines, the inspection device comprising:
    a sensor carrier, which in operation is rollable through the pipeline, the sensor carrier including:
        an at least essentially circular base plate defining a circumference in a cross section that runs transverse to an axis of rotation,
        at least one stabilizing means disposed along the circumference, the at least one stabilizing means including a plurality of permanent magnets radially spaced from the axis of rotation,
        a sensor unit supported by and extending through the base plate, the sensor unit extending beyond the plurality of permanent magnets;
    wherein the inspection device moves in a direction at least substantially transverse to the axis of rotation and rolls on the at least essentially circular circumference during operation;
    wherein the inspection device is configured to be passively driven by a medium flowing through the pipeline, and
    wherein, as the inspection device rolls along a magnetizable pipe wall of the pipeline, the plurality of permanent magnets induce eddy currents in the magnetizable pipe wall that counteract positive acceleration of the inspection device for increased stability of the inspection device during operation.

2. The inspection device as claimed in claim 1, wherein a north-south alignment of the permanent magnets runs parallel with respect to the axis of rotation.

3. The inspection device as claimed in claim 2, wherein the permanent magnets are arranged close to one another along the circumference.

4. The inspection device as claimed in claim 1, wherein a north-south alignment of the permanent magnets runs radially with respect to the axis of rotation.

5. The inspection device as claimed in claim 4, wherein the magnets are arranged close to one another along the circumference.

6. The inspection device as claimed in claim 1, wherein the permanent magnets are bounded at least on one side by a surround which includes a magnetizable material.

7. The inspection device as claimed in claim 1, wherein the sensor carrier has a spheroidal or ellipsoidal shell.

8. The inspection device as claimed in claim 7, wherein the sensor carrier has an ellipsoidal shell in which lengths of two semi-axes, are greater than that of a third semi-axis lying in the axis of rotation.

9. The inspection device as claimed in claim 1, wherein the sensor carrier is held rotatably in a supporting element provided for supporting the inspection device against a pipeline wall.

10. The inspection device as claimed in claim 1, wherein the circumference is at least partly formed by at least one damping element produced at least partly from plastic and/or by at least one rolling element.

11. The inspection device as claimed in claim 10, wherein a load-bearing structure for the sensor carrier is formed at least partly from the plastic or a further plastic.

12. The inspection device as claimed in claim 1, wherein the sensor unit of the inspection device includes at least one sensor from the group comprising gyroscopes, acceleration sensors, magnetic field sensors, sound sensors, EMAT sensors, pressure sensors and temperature sensors.

13. The inspection device as claimed in claim 12, wherein the inspection device records an image and/or a sequence of images depending on a position partly determined by a sensor.

14. The inspection device as claimed in claim 1, wherein the inspection device includes a camera and/or a generator having a generator coil.

15. The inspection device as claimed in claim 14, wherein the inspection device records an image and/or a sequence of images depending on a position partly determined by a sensor.

16. The inspection device as claimed in claim 1, wherein the inspection device includes at least one propulsion element.

17. The inspection device as claimed in claim 1, wherein the sensor carrier has an average density variable by means of fillable cavities in the inspection device and/or weight elements integratable into the sensor carrier and/or an exchangeable load-bearing structure.

18. The inspection device as claimed in claim 1, further including a central unit connected to one or more inspection devices.

* * * * *